Dec. 30, 1969     E. G. R. ROBERTS     3,486,553
MARINE REFRIGERATION
Filed Sept. 28, 1967
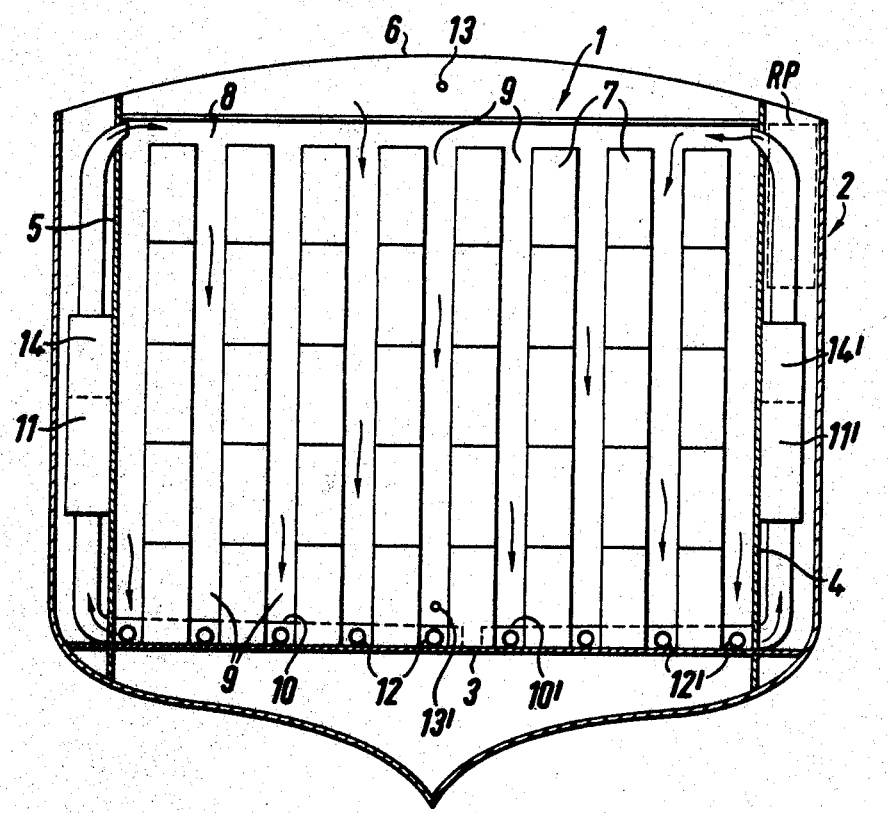
INVENTOR
Edmund Godfrey Russell Roberts
BY
Michael S. Striker,
ATTORNEY United States Patent Office 3,486,553
Patented Dec. 30, 1969

3,486,553
MARINE REFRIGERATION
Edmund G. Russell Roberts, Kent, England, assignor to J. & E. Hall Limited, London, England, and Shipowners Refrigerated Cargo Research Association, Cambridge, England
Filed Sept. 28, 1967, Ser. No. 671,342
Claims priority, application Great Britain, Oct. 5, 1966, 44,427/66
Int. Cl. F25b *13/00;* B60h *3/00;* B63b *25/26*
U.S. Cl. 165—2                            6 Claims

ABSTRACT OF THE DISCLOSURE

The invention relates to the transportation of refrigerated bulk cargo containers in the hold of a ship by the method involving cooling a plurality of containers by passing cooling air through the containers from a central refrigerating plant and proposes the improvement of circulating an independent stream of ambient air in the hold past an air-heater or air-cooler and about the containers so that the ambient air temperature may be controlled within desired limits.

---

This invention relates to improvements in and relating to the containerised transport of cargo in ships and in particular to a method of controlling the temperature in a hold space given over to the transport of bulk-cargo containers.

It has been proposed to transport a large number of bulk-cargo containers in the hold space of a ship, and one method proposed for refrigerating such containers during transport involves connecting each container to a refrigerant supply (e.g. a supply of refrigerated air at supra-atmospheric pressure) derived from a main refrigerating plant on board the ship, allowing the refrigerant to circulate through the load space of the containers in the case of cooled air and to circulate through a heat-exchanger associated with the load space in the case of a liquid refrigerant, and returning the refrigerant to the plant. By employing the method outlined above, it will be appreciated that the interior of each refrigerated bulk-cargo container is in direct thermal communication with the refrigerating plant of the ship and by virtue of the thermal insulation which is conventionally provided for each container, the contents of the containers are to a very large extent isolated from the ambient air in the hold. In practice, the isolation is not complete, and in fact the rate of thermal leakage into a container is a function of the ambient air surrounding the container. A proposal has been made for equalising the temperature in the hold of a ship containing thermally-insulated refrigerated bulk-cargo containers by circulating the ambient air within the hold past the array of containers and through the spaces between adjacent columns of containers. Preferably the ambient air is withdrawn from the spaces between adjacent columns at or close to the bottom of the hold and is returned at or adjacent to the top of the hold.

There are occasions when it is not sufficient just to equalise the temperature within the hold of a ship containing thermally-insulated refrigerated bulk-cargo containers, since the ambient temperature may be too high or too low.

For example, when a mixed cargo is transported in a hold, part of the cargo comprising thermally-insulated refrigerated containers and the remainder comprising general cargo in non-refrigerated containers, the presence of the refrigerated cargo containers and the ancillary equipment required to couple them to the refrigerating plant of the ship may cause such a reduction in the ambient temperature within the hold that the general cargo is in danger of being deleteriously affected. Under these conditions, it is desirable to raise the ambient temperature within the hold.

There may be occasions when it is desirable to cool the air within the hold, and such occasions might arise where the bulk-cargo containers are located in a substantially thermally uninsulated hold or where containers are loaded into the hold whose outer surfaces have been heated, for example while awaiting shipment, by high ambient temperatures or by the sun.

Further, and quite surprisingly, it has been found that by providing means for heating the ambient air in the hold of a ship given over to the transport of refrigerated containers it is possible to effect significant economies in the capital cost of the ship itself. These economies arise because the grade of steel which can be employed for a particular region of a ship is in part dictated, in accordance with regulations laid down by classification and registration societies, by the lowest temperatures which might be expected to exist in that region, a higher and more expensive grade of steel being required where temperatures lower than a particular minimum temperature are to be expected. By providing means for warming the ambient air in a hold which contains refrigerated containers, use of a higher and more expensive grade of steel is avoided, by ensuring that the ambient temperature in the hold is kept above the minimum stipulated for the normal grade of steel.

According to the present invention a marine vessel comprises at least one hold, refrigeration means permanently mounted in the vessel for cooling the interior of a plurality of thermally-insulated containers stowed in the hold and means to circulate the ambient air through the hold exteriorly of containers stowed therein and past a heating and/or cooling means serving to alter the temperature of the ambient air in the hold.

The invention is described in greater detail with reference to the accompanying drawing which shows, purely schematically, a cross-section through the hold of a ship containing refrigerated containers.

Referring to the drawing, the hold 1 is formed in the hull 2 of a ship by a tank bottom 3, bulkheads 4 and 5 and a hatch cover 6. The hold may be only lightly thermally insulated or even substantially thermally uninsulated.

Located within the hold 1 is an array of bulk-cargo containers 7 arranged in a plurality of columns each containing a plurality of containers. The specific hold shown has eight columns each having five containers, but clearly other arrays are possible and the particular array selected for any given hold will depend on the shipowners requirements as well as the relative sizes of the containers and the hold. Each container 7 is thermally insulated and is located in a coupling station where it is coupled to supply and return pipes (not shown) for refrigerated air fed from a central refrigeration plant (shown schematically as RP). The individual supply and return pipes for the separate containers are carried by a structure 8 extending across the hold and providing gangways for personnel to walk at the different levels of the coupling stations.

Pipes 10 and 10' extend transversely across the hold at the bottom of the structure 8 from port and starboard sides towards the centre and are each connected to a combined fan and heat-exchanger 11 or 11' housed in the space between the hull 2 and the respective bulkhead 4 or 5. The pipes 10 and 10' each include flexible, perforated inlet pipes 12 and 12' which are placed in the spaces 9 as the containers are placed in the coupling stations in the hold. During the voyage (either continuously or periodically e.g. as sensed by temperature-sensitive devices 13 and 13' placed in the hold), the fans operate to draw air from the spaces 9 pass it through the heat-exchangers (shown as 14, 14') and return it to the top of the hold.

By employing the air circulating means proposed by the invention, the temperature of the ambient air in a hold may be controlled within desired limits.

Since there are occasions where it may be desirable to heat the ambient air and other occasions where it may be desirable to cool the ambient air, it is convenient to employ a heat-exchanger 14, 14' through which hot brine can be circulated when heating of the ambient air is required and refrigerated brine can be circulated when cooling of the ambient air is required.

It will be appreciated that the embodiment shown in the drawing is purely schematic and that a number of modifications can be made without departing from the scope of the following claims. Thus, for example, the arrangement of pipes 10, 10' and 12, 12' need not be employed, and the fans and heat-exchangers can be located in the hold space itself. It will also be appreciated that any form of heating and/or cooling means can be employed to achieve the desired control of the temperature of the ambient air within the hold.

When heating is employed, it may be advantageous to reverse the direction of air circulation shown in the drawing, so that the heated air is introduced at the bottom of the hold, and the supply to the fans is drawn from the air near the top of the hold.

What is claimed is:

1. In a marine vessel, a combination comprising a hull; at least one hold provided in said hull and arranged to accommodate a plurality of thermally insulated bulk-cargo containers; refrigeration means permanently installed in the hull for circulating a cooling medium through the containers in said hold; temperature modifying means mounted in the hull and independent of said refrigeration means; and circulating means for circulating ambient air past said temperature modifying means through the hold and about said containers to thereby maintain the temperature of ambient air around the containers in said hold within a predetermined range and independently of the temperature maintained by said cooling medium within said containers in said hold.

2. A combination as defined in claim 1, wherein said cooling medium is air.

3. A combination as defined in claim 1, wherein said temperature modifying means is arranged to maintain the circulating air at a temperature which is different from the temperature of said cooling medium.

4. A combination as defined in claim 1, wherein said temperature modifying means comprises a heat exchanger through which brine can be passed.

5. A combination as defined in claim 1, wherein said hold comprises a wall constituting a bulkhead and wherein said circulating means comprises a fan mounted between the hull and said bulkhead.

6. A method of transporting thermally insulated bulk-cargo containers in the hold of a marine vessel, comprising the steps of stowing the containers within the hold; cooling air at at least one first location in the vessel, circulating the thus cooled air from said first location through the containers which are stowed in said hole; circulating ambient air around the containers in said hold; and conditioning the circulating ambient air at at least one second location to maintain the temperature of the circulating ambient air within a predetermined range independently of the temperature of the air within said containers.

References Cited

UNITED STATES PATENTS

| | | | |
|---|---|---|---|
| 2,439,487 | 4/1948 | Reilly | 165—42 |
| 2,943,842 | 7/1960 | Sullivan | 165—27 |
| 3,225,822 | 12/1965 | Westling | 62—240 |

ROBERT A. O'LEARY, Primary Examiner

C. SUKALO, Assistant Examiner

U.S. Cl. X.R.

165—42; 62—240